United States Patent

(12) United States Patent
Clutton et al.

(10) Patent No.: US 6,489,427 B1
(45) Date of Patent: Dec. 3, 2002

(54) POLYMER COMPOSITIONS

(75) Inventors: Edward Quentin Clutton, Edinburgh (GB); Philip Stephen Hope, Alva (GB)

(73) Assignee: BP Chemicals Limited, London (GB)

(*) Notice: Subject to any disclaimer, the term of this patent is extended or adjusted under 35 U.S.C. 154(b) by 0 days.

(21) Appl. No.: 09/668,350

(22) Filed: Sep. 25, 2000

Related U.S. Application Data

(63) Continuation of application No. PCT/GB99/00924, filed on Mar. 24, 1999.

(30) Foreign Application Priority Data

Mar. 25, 1998 (GB) .............................. 9806407

(51) Int. Cl.$^7$ .......................... C08F 110/02; C08F 4/42
(52) U.S. Cl. ................. 526/352; 526/160; 526/943; 526/123.1; 526/124.1; 526/124.3; 526/154; 526/158
(58) Field of Search .................. 526/352, 160, 526/943, 123.1, 124.1, 124.3, 154, 158

(56) References Cited

FOREIGN PATENT DOCUMENTS

| EP | 0 339 571 | 11/1989 |
|----|-----------|---------|
| EP | 0 763 550 | 3/1997 |
| EP | 0 783 022 | 7/1997 |
| WO | WO 96/14358 | 5/1996 |
| WO | WO 97/43323 | * 11/1997 |
| WO | WO 98/05422 | * 2/1998 |

* cited by examiner

*Primary Examiner*—David W. Wu
*Assistant Examiner*—Ling-Siu Choi
(74) *Attorney, Agent, or Firm*—Finnegan, Henderson, Farabow, Garrett & Dunner, L.L.P.

(57) ABSTRACT

Polyethylenes are prepared having a density in the range 900–980 kg/m$^3$ and a weight average molecular weight $\geq$375,000 characterized by a fracture toughness at −40° C. >20 kJ/m$^2$ and a dynamic viscosity of <3000 Pa.s at 100 rad/sec. The polymers also having a die swell of 10–80% and show a desirable combination of physical and processing properties. The polymers are prepared by the use of catalysts comprising a metallocene component and a Ziegler component.

21 Claims, No Drawings

POLYMER COMPOSITIONS

This application is a continuation of international application No. PCT/GB99/00924 filed Mar. 24, 1999.

The present invention relates to novel polymer compositions-and in particular to polymer compositions having improved physical properties as well as improved processability.

In recent years there have been many advances in the production of polyolefin copolymers due to the introduction of metallocene catalysts. Metallocene catalysts offer the advantage of generally higher activity than traditional Ziegler catalysts and are usually described as catalysts which are single-site in nature. Because of their single-site nature the polyolefin copolymers produced by metallocene catalysts often are quite uniform in their molecular structure. For example, in comparison to traditional Ziegler produced materials, they have relatively narrow molecular weight distributions (MWD) and narrow Short Chain Branching Distribution (SCBD). By narrow SCBD, it is meant that the frequency of short chain branches, formed where comonomers incorporate into the polyolefin chain, is relatively independent of molecular weight. Although certain properties of metallocene products are enhanced by narrow MWD, difficulties are often encountered in the processing of these materials into useful articles and films relative to Ziegler produced materials. In addition, the uniform nature of the SCBD of metallocene produced materials does not readily permit certain structures to be obtained.

One approach to improving processability has been the inclusion of long chain branching (LCB), which is particularly desirable from the viewpoint of improving processability without damaging advantageous properties. U.S. Pat. Nos. 5,272,236; 5,278,272; 5,380,810; and EP 659,773, EP 676,421, relate to the production of polyolefins with long chain branching.

Another approach is the addition of the polymer processing aids to the polymer prior to fabrication into films or articles. This requires extra processing and is expensive.

A different approach to the problem has been to make compositions which are blends or mixtures of individual polymeric materials with the aim being to maximise the beneficial properties of given components while minimising its processing problems. This also requires extra processing which increases the cost of materials produced. U.S. Pat. Nos. 4,598,128; 4,547,551; 5,408,004; 5,382,630; 5,583,631; and 5,326,602; and WO 94/22948 and WO 95/25141 relate to typical blends.

Another way to provide a solution to the processability problems and to vary SCBD has been the development of various cascade processes, where the material is produced by a series of polymerisations under different reactor conditions, such as in a series of reactors. Essentially, a material similar in some ways to a blend is produced, with a modality greater than one for various physical properties, such as the molecular weight distribution. While polyolefin compositions with superior processability characteristics can be produced this way, these methods are expensive and complicated relative to the use of a single reactor. Processes of interest are disclosed in U.S. Pat. No. 5,442,018, WO 95/26990, WO 95/07942 and WO 95/10548.

Another potentially feasible approach to improving processability and varying SCBD has been to use a multicomponent catalyst. In some cases, a catalyst which has a metallocene catalyst component and a conventional Ziegler-Natta catalyst component are used on the same support to produce a multimodal material. In other cases two metallocene catalysts have been used in polyolefin polymerisations. Components of different molecular weights and compositions are produced in a single reactor operating under a single set of polymerisation conditions. This approach however is difficult from the point of view of process control and catalyst preparation. Catalyst systems of interest are disclosed in WO 95/11264. The polymer produced in this disclosure are blends of polymers having a bimodal molecular weight distribution. They are also prepared specifically in a gas phase fluidised bed reactor.

We have now surprisingly found novel polyethylene compositions which exhibit both improved physical properties exemplified by their initial fracture toughness and improved processability as exemplified by their dynamic viscosity. The novel polyethylenes also show a high density and high molecular weight.

Thus according to the present invention there is provided a polyethylene having an annealed density in the range 900 to 980 kg/m³ and a molecular weight greater than 200,000 characterised in that the polyethylene has (a) an initiation fracture toughness ($G_p$) at −40° C. of greater than 20 kJ/m²,
(b) a dynamic viscosity of <3000 Pa.s at 100 rad/sec (190° C.) and <3000 kpa.s at 0.01 rad/sec (190° C.); and
(c) a mass flow rate (MFR) under 21.6 kg load (190° C.) of 0.01–100 g/10 min.

Preferably the polyethylene according to the present invention has a fracture toughness greater than 25kJ/m², a dynamic viscosity <2500 Pa.s at 100 rad/sec (190° C.) and <1500 kPa.s at 0.01 rad/sec (190° C.) and a MFR of 0.2–10 g/10 min (21.6 kg load).

The preferred density for the polyethylenes of the present invention is in the range 930 to 970 kg/m³ and a molecular weight preferably greater than 400,000.

The polyethylenes of the present invention may also be characterised by having a die swell in the range 10–80%.

Thus according to another aspect of the present invention there is provided a polyethylene having an annealed density in the range 900–980 Kg/m³ and a molecular weight greater than 200,000 characterised in that the polyethylene has (a) an initiation fracture toughness (Gp) at −40° C. of greater than 20 kJ/m²
(b) a dynamic viscosity of <3000 Pa.s at 100 rad/sec (190° C.) and <3000 Kpa.s at 0.01 rad/sec (190° C.), and
(c) a die swell in the range 10–80%.

The polyethylenes of the present invention preferably have a die swell in the range 20–40%.

The novel polyethylenes of the present invention may suitably be prepared by use of a multisite catalyst having two catalytic components. For example a Ziegler component and a component based on a metallocene complex. Alternatively the multisite catalyst may comprise two metallocene components.

Examples of suitable metallocene components are complexes which may be represented by the general formula:

wherein Cp is a substituted or unsubstituted cyclopentadienyl nucleus; M is a Group IVA, VA or VIA transition metal in particular Zr, Ti, Hf, R and $R^1$ are independently hydrocarbyl having 1–20 carbon atoms, halogen or other suitable monovalent ligand; m=1–3, x=0–3 and y=0–3 wherein the sum of m, x and y equal the oxidation state of M.

Preferred metallocenes are those wherein M is Zr, Hf or Ti, R and $R^1$ are alkyl or halogen and m=2.

Preferred metallocene complexes are those described in EP 129368, EP 206794 and EP 586167.

Particularly suitable are complexes in which the cyclopentadienyl nucleus is substituted by alkyl groups for example butyl groups.

A particularly suitable complex is bis(2-butyl) cyclopentadienyl zirconium dichloride.

The Ziegler component of the multisite catalyst may typically be a traditional Ziegler polymerisation catalyst well known to those skilled in the art. Preferably the Ziegler component of the multisite catalyst is one comprising atoms of titanium and halogen usually chloride and also preferably magnesium. Such catalysts and their preparation will be well known to those skilled in the art.

The multisite catalyst is preferably supported and is most preferably supported on an inorganic support for example silica, alumina or magnesium chloride. The preferred support is silica.

The multisite catalyst may be supported by any traditional method of support. For example the support may preferably be initially impregnated by the Ziegler component prior to impregnation with the metallocene.

Preferably the silica support has been precalcined by heating before impregnation.

The multisite catalyst may also comprise an activator. The preferred activator is aluminoxane, most preferably methyl aluminoxane (MAO). The activator is preferably present in an amount such that the ratio of metallocene to metal (aluminium) is in the range 1–10,000: 10,000: 1 but is preferably in the range 1–100: 100:1.

The novel polyethylenes of the present invention are most suitably prepared by polymerisation of ethylene in the slurry phase in a batch mode of operation. The polymerisation is carried out in a single reactor using an inert solvent for example isobutane at a temperature in the range 80–110° C. and at a pressure in the range 400–650 psig. The polymerisation preferably takes place in the presence of a cocatalyst for example an organoaluminium compound. The preferred cocatalyst is a trialkylaluminium for example trimethylaluminium.

It has also been found possible to prepare the novel polyethylenes of the present invention by forming a blend of materials for example a blend of a metallocene derived polyethylene together with a low molecular weight component. The first component of the blend may be a polyethylene having a molecular weight >200,000 and the second component may be a polyethylene having a molecular weight <200,000. The second component typically is a high density polyethylene. The metallocene derived polyethylene may be prepared using a metallocene complex having the general formula described above. In this respect however it has been found that hafnium metallocenes are most suitable for example bis (2-propenyl) cyclopentadienyl hafnium dichloride.

The low molecular weight component typically has a molecular weight it the range 60,000–95,000.

In order to be processable in extrusion blow moulding pipe and film applications the primary requirements are that the polymer melt should be extrudable and also that it should be resistant to instability or rupture.

The novel polyethylenes of the present invention exhibit these properties of extreme toughness and improved processability. This combination of properties therefore make the novel polymers suitable for use in a wide range of applications. In particular they may be used for high molecular weight blow moulding applications such as large containers as well as pipe and tough film applications.

Thus according to another aspect of the present invention there is provided a pipe or film or moulded article comprising a polyethylene as hereinbefore described.

The novel polymer compositions were characterised by use of the following experimental techniques.

Experimental Techniques

1. Toughness

Toughness was measured using a non-standard Charpy impact test and an impact test machine capable of measuring the load-deformation profile during the impact event. The specimen was 55 mm long, 6.7 mm deep and 6 mm thick and had a 1.7 mm deep sharp notch machined centrally with respect to the length and leaving a ligament of 5 mm behind the notch. Impact testing was performed using a span of 40 mm and an impact speed of 1 m/s over a range of temperature from 23C. down to much lower temperatures. The lower test temperatures depend on the toughness of the material; the higher the toughness, the lower the temperature must be in order to achieve fracture of the specimen. Typically for the tougher materials, temperatures below −60C. are required and down to as low as −120C. At least 5 data points were required in order to assess the toughness of the material and these must cover a temperature range of at least 20C.

For each test at a given temperature, the energy required to initiate crack growth was determined from the area under the load trace up to the point at which fracture occurs (denoted by a sudden load drop). This energy, Up(J), was then divided by $0.52*B*D$, where B(mm) and D(mm) are the specimen thickness and depth, respectively, to obtain the toughness Gp(kJ/m2). A graph was then drawn of toughness in KJ/m2 against temperature in degrees Celsius, from which a toughness value at −40C. was derived. In most cases for tough materials, the data have been obtained at temperature below −40C. and the toughness at −40C. is derived by fitting a line of the form $$Gp=A*(T+150)+5$$

to the data. The toughness at −40C., denoted Gp(−40) is then given by $$Gp(-40)=A*110+5$$

in the small number of cases where toughness can be measured at −40C., then the value quoted for Gp(−40) is the measured value.

The value quoted is Gp(−40) in units of kJ/m2.

2. Dynamic Viscosity

Samples for dynamic rheometry were prepared by compression moulding sheet (nominally 1–2 mm thickness) using an electrically heated hydraulic press. The starting powder or pellet is placed between the pre-heated platens of the press (200C.) and allowed to heat for 1 minute before being pressed for 2 minutes. The heating is switched off, and the press water-cooled to ambient temperature before the moulding is released.

Dynamic frequency scans are carried out using a rotational rheometer (Rheometrics RDS2) equipped with 25 mm diameter parallel plates enclosed in an environmental chamber. The environmental chamber is heated using nitrogen gas to avoid excessive sample degradation during testing. A 25 mm diameter disk is stamped from moulded sheet and placed between the pre-heated rheometer plates, which are then closed in such a way as to avoid the generation of excessive normal forces. The sample is trimmed and the oven closed to establish a testing temperature of 190C. A frequency scan is then performed at 10% applied strain over the range 100 rad/s to 0.01 rad/s.

The dynamic viscosity (eta') is then calculated at each testing frequency using standard equations [Draft International Standard ISO/DIS 6721/10].

Values of eta' are quoted at frequencies of 100 rad/s (eta'(100), in units of Pa.s) and 0.01 rad/s (eta'(0.01) in units of kPa.s).

3. Melt Mass-Flow Rate (MFR)

Melt mass-flow rate of the materials is measured to ISO 1133:1997-condition 7.

The value quoted is MFR in dg/min.

4. Die Swell

Die swell is determined on solidified extrudate from a melt mass-flow rate test carried out according to ISO 1133:1997-condition 7. Six cut-offs about 25 mm in length, and free from air bubbles and distortion, are taken and allowed to cool evenly. The diameter of each cut-off is measured in two perpendicular directions, 6.35 mm from the leading edge of the cut-off, using a dial gauge micrometer. The die swell is calculated according to $$Die\ Swell = 100 * (d - do)/do$$

where d is the mean diameter of the cut-off and do is the diameter of the die orifice in the melt flow rate apparatus. The average value of Die Swell for the six cut-offs is then calculated.

The value quoted is Die Swell in %.

5. Annealed Density

Annealed density for the materials is determined on extrudate from the melt flow rate evaluation in accordance with ISO1872/1-1986.

The value quoted is density in kg/m3.

6. Weight Average Molecular Weight

The distribution of molecular weights is first determined by size exclusion chromatography of the polymer dissolved in trichlorobenzene at 140C. A series of narrow polystyrene standards is used to calibrate the elution time, using the Polymer Handbook ($3^{rd}$ Edition) values for the Mark-Houwink parameters to convert PS molecular weight to PE molecular weight. The weight average of the distribution is then calculated via the formula:

$$Mw = Sigma\ wi\ Mi\ /\ Sigma\ wi$$

wi being the weight of the fraction of molecular weight Mi.

The value quoted is Mw.

The present invention will now be further illustrated by reference to the accompanying examples.

Preparation of Catalyst

The following procedure was used to prepare a supported multisite (metallocene/Ziegler) catalyst.

A silica (ES70X) support (precalcined to 600° C. for 6 hrs under $N_2$) was slurried in dry hexane at 55° C. A solution of dibutyl magnesium in heptane was added resulting in a 40 g ES70X/350 ml hexane/28.4 mmol dibutylmagnesium slurry. After 1 hour 2.6 mmol butanol was added followed by 1.6 mmol $TiCl_4$. The solvent was subsequently removed under vacuum to give a dry catalyst powder.

The resultant supported Ziegler catalyst was subsequently impregnated with a bis (n-butyl) cyclopentadienyl zirconium dichloride/MAO adduct (prepared by mixing both in toluene solution). The metallocene/MAO solution was added to the Ziegler catalyst followed by vacuum drying to give a dry catalyst powder.

The resultant supported multisite catalyst had the following analysis

Mg 1.12%

Ti 0.92%

Al 12.2%

Zr 0.38%.

The above catalyst was used to polymerise ethylene in a batch reactor in the presence of trimethylaluminium as cocatalyst. The polymerisation was performed in the slurry phase in isobutane. The following Examples 1–3 represent polymerisations under the conditions given in Table 1.

The polymer product was stablised and compounded using a Prism lab scale twin screw extruder. Three passes through the compounder were used to ensure adequate homogeneity while avoiding molecular weight degradation.

TABLE 1

| Example | 1 | 2 | 3 |
|---|---|---|---|
| Reactor pressure (psig) | 600 | 600 | 600 |
| Reactor temp. (° C.) | 85 | 85 | 85 |
| Catalyst wt (g) | 1.2 | 1.35 | 1.3 |
| $H_2$ pressure (psig) | 10 | 4 | 2 |
| Isobutane (liters) | 40 | 40 | 40 |

EXAMPLE 4

A high molecular weight polymer was prepared in accordance with the following procedure.

Silica, ES70X (preclaimed at 200° C. under $N_2$ for 5 hrs) was impregnated with a slurry of MAO in toluene by refluxing at 115° C. for 3 hours under $N_2$ followed by cooling to room temperature, filtering, washing and drying. The resultant support was then impregnated with bis (2-propenyl) cyclopentadienyl hafnium dichloride in dry toluene for 1 hr at ambient temperature followed again by filtration, washing with toluene and vacuum drying. The supported metallocene/MAO catalyst had the following analysis:

Al 11.4%

Hf 0.66%.

A high molecular weight, high density polyethylene homopolymer was made using a blend of (a) the polymer prepared using the previously described procedure and (b) a low molecular weight commercially available injection moulding grade polymer (weight average molecular weight of 75,000). The blend was prepared by dissolving the components in xylene at 125° C. followed by stirring for 30 min. then precipitating the solution in acetone. The resulting product was dried and stabilised with 0.2% Ciba Geigy Irganox 1010.

The final blended product had the properties shown below in Table 2.

EXAMPLE 5 (Comparative)

A high molecular weight, high density polyethylene homopolymer (Rigidex HM5420XP(H) sold by BP Chemicals) had the product properties listed in Table 2. The polymer was prepared using Phillips single site technology.

EXAMPLE 6 (Comparative)

A high molecular weight, high density polyethylene homopolymer (Hizex 9200B sold by Mitsui Chemicals) had the product properties listed in Table 2. The polymer was prepared using typical Ziegler cascade technology.

The results clearly show the novel polymers of the present invention exhibit both extreme toughness and processability when compared with the prior art materials.

TABLE 2

POLYMER PROPERTIES

| Example | Fracture Toughness (Gp) (kJ/m$^2$) | Dynamic Viscosity | | MFR g/10 min (21.6 kg load) | Annealed Density (kg/m$^3$) | Weight Average M. Wt. | Die Swell % |
|---|---|---|---|---|---|---|---|
| | | 100 rad (Pa·s) | 0.01 rad (kPa·s) | | | | |
| 1 | 27   | 1440 | 1080 | 1.49 | 961 | 501,000 | 22 |
| 2 | 40.3 | 2400 | 1340 | 0.55 | 952 | 548,000 | 21 |
| 3 | 51.2 | 2750 | 780  | 0.71 | 949 | 488,000 | 33 |
| 4 | 31.7 | 2300 | 520  | 0.66 | 948 | 375,000 | 28 |
| 5 | 19.2 | 1910 | 701  | 2.2  | 954 | 376,000 | 42 |
| 6 | 19.5 | 1980 | 699  | 1.3  | 955 | 392,000 | 21 |

We claim:

1. A polyethylene having an annealed density in the range 900 to 980 Kg/m$^3$ and a weight average molecular weight of 375,000 or more, wherein the polyethylene has (a) an initiation fracture toughness (Gp) at −40° C. of greater than 20 kJ/m$^2$, (b) a dynamic viscosity of <3000 Pa.s at 100 rad/sec (190° C.) and <3000 kPa.s at 0.01 rad/sec (190° C.), and (c) a mass flow rate (MFR) under 21.6 kg load (190° C.) of 0.01–100 g/10 min.

2. A polyethylene according to claim 1 having (a) an initiation fracture toughness >25 kJ/m$^2$, (b) a dynamic viscosity <2500 Pa.s at 100 rad/sec and <1500 kPa.s at 0.1 rad/sec, and (c) a MFR of 0.2–10 g/min.

3. A polyethylene having an annealed density in the range of 900–980 Kg/m$^3$ and a weight average molecular weight of 375,000 or more, wherein the polyethylene has (a) an initiation fracture toughness (Gp) at −40° C. of greater than 20 kJ/m$^2$, (b) a dynamic viscosity of <3000 Pa.s at 100 rad/sec (190° C.) and <3000 kPa.s at 0.01 rad/sec (190° C.), and (c) a die swell in the range of 10–80%.

4. A polyethylene according to claim 3 having a die swell in the range 20–40%.

5. A polyethylene according to claim 1 having an annealed density in the range 930–970 kg/m$^3$ and a weight average molecular weight >400,000.

6. A process for preparing a polyethylene according to claims 1 comprising polymerising ethylene in the presence of a catalyst comprising a metallocene component and a Ziegler catalyst component.

7. A process according to claim 6 wherein the metallocene component has the general formula $(Cp)_m\, M\, R_x R^1_y$ wherein Cp=substituted or unsubstituted cyclopentadienyl nucleus M is a group IVA, VA, or VIA transition metal R and R$^1$ are each a monovalent ligand, m=1–3 x,y=0–3 and wherein the sum of m,x and y equal the oxidation state of M.

8. A process according to claim 7 wherein

M=Zr, Hf, or Ti

R and R$^1$=alkyl or halogen, and m=2.

9. A process according to claim 7 wherein the metallocene component is bis(n-butyl) cyclopentadienyl zirconium dichloride.

10. A process according to claim 6 wherein the catalyst comprises an activator.

11. A process according to claim 10 wherein the activator is an aluminoxane.

12. A process according to claim 6 wherein the catalyst is supported.

13. A process according to claim 12 wherein the support is silica.

14. A process according to claim 6 performed in the slurry phase in a batch mode of operation.

15. A process according to claim 6 performed in the presence of a cocatalyst.

16. A process according to claim 15 wherein the cocatalyst is an organoaluminium compound.

17. A polyethylene according to claim 1 comprising a blend of (a) a polyethylene having a weight average molecular weight >375,000 and (b) a polyethylene having a weight average molecular weight <200,000.

18. A polyethylene according to claim 17 wherein the component (a) is prepared from a metallocene catalyst.

19. A polyethylene according to claim 18 wherein the metallocene is bis(2-propenyl) cyclopentadienyl hafnium dichloride.

20. A polyethylene according to claim 17 wherein the component (b) has a weight average molecular weight in the range 60,000–95,000.

21. A film pipe or molded article comprising a polyethylene as claimed in claim 1.

* * * * *

UNITED STATES PATENT AND TRADEMARK OFFICE
CERTIFICATE OF CORRECTION

PATENT NO.   : 6,489,427 B1                                           Page 1 of 1
DATED        : December 3, 2002
INVENTOR(S)  : Edward Quentin Clutton et al.

It is certified that error appears in the above-identified patent and that said Letters Patent is hereby corrected as shown below:

<u>Column 7,</u>
Line 47, "claims 1" should read -- claim 1 --.

<u>Column 8,</u>
Line 44, ">375,000" should read -- $\geq$375,000 --.
Line 57, "film pipe" should read -- film, pipe --.

Signed and Sealed this

Sixth Day of May, 2003

JAMES E. ROGAN
*Director of the United States Patent and Trademark Office*